F. V. DE ARMOND.
BOOSTER APPLIANCE FOR LOCOMOTIVES AND OTHER AUTOMOTIVE MACHINES.
APPLICATION FILED JUNE 18, 1921.

1,417,302.

Patented May 23, 1922.
3 SHEETS—SHEET 1.

Inventor
Frank Vere DeArmond.

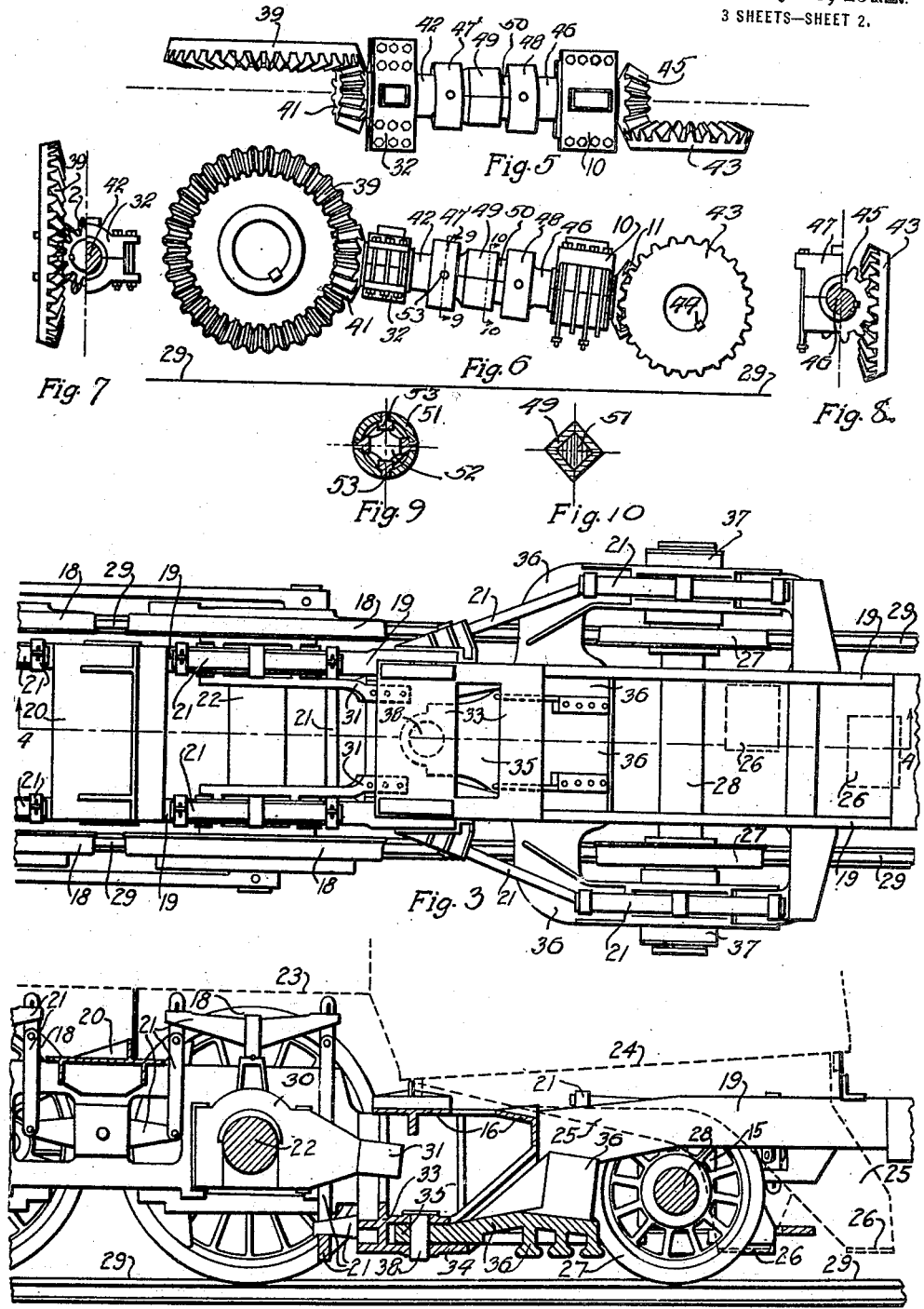

F. V. DE ARMOND.
BOOSTER APPLIANCE FOR LOCOMOTIVES AND OTHER AUTOMOTIVE MACHINES.
APPLICATION FILED JUNE 18, 1921.

1,417,302.

Patented May 23, 1922.

Inventor
Frank Vere DeArmond

UNITED STATES PATENT OFFICE.

FRANK V. DE ARMOND, OF TOPEKA, KANSAS.

BOOSTER APPLIANCE FOR LOCOMOTIVES AND OTHER AUTOMOTIVE MACHINES.

1,417,302. Specification of Letters Patent. Patented May 23, 1922.

Application filed June 18, 1921. Serial No. 478,732.

*To all whom it may concern:*

Be it known that I, FRANK V. DE ARMOND, a citizen of the United States, residing at Topeka, in the county of Shawnee and State of Kansas, have invented certain new and useful Improvements in Booster Appliances for Locomotives and Other Automotive Machines, of which the following is a specification.

This invention relates to locomotives and other automotive vehicles and has for an object to provide for driving wheels of different diameters so that the several wheels such as are ordinarily found beneath automotives are all converted into traction wheels.

A further object of the invention is to provide connections between the wheels of a locomotive ordinarily designated as driving wheels and the wheels ordinarily referred to as truck wheels, whereby the truck wheels are driven in such relation to the drivers as to provide substantially equal circumferential movement of all of said wheels relative to the rails.

A further object of the invention is to provide a locomotive embodying wheels of the driver type and truck type with transmission mechanisms interposed between the said wheels permitting the truck wheels to swing relative to the locomotive structure for rounding curves and the like and to likewise apply to said truck wheels motive power to convert said truck wheels into auxiliary drivers.

With this and further objects in view, the invention comprises certain novel elements, units, parts, combinations, mechanical movements and functions as disclosed in the drawing, together with mechanical equivalents thereof as will be hereinafter more fully described and claimed.

In the drawings:—

Fig. 3 is a top plan view of the frame of a locomotive arranged to receive the transmission mechanism, but with such transmission mechanism removed.

Fig. 4 is a vertical longitudinal sectional view through the frame of a locomotive, as indicated by line 4—4 of Fig. 3.

Fig. 5 is a top plan view of the transmission mechanism for transmitting power from the drivers to the truck, disassociated from the other parts.

Fig. 6 is a view in side elevation of the transmission mechanism.

Fig. 7 is a view in end elevation of the transmission mechanism, seen from the driving end, one-half of the shaft and bearing being shown in section.

Fig. 8 is a view in end elevation of the transmission mechanism seen in the truck end, one-half of the shaft and bearing being shown in section.

Fig. 9 is a sectional view through one of the universal joints taken on the line 9—9 of Fig. 6.

Fig. 10 is a transverse sectional view through the telescoping joint, taken on the line 10—10 of Fig. 6.

Like characters of reference indicate corresponding parts throughout the several views.

Figures 1, 2:
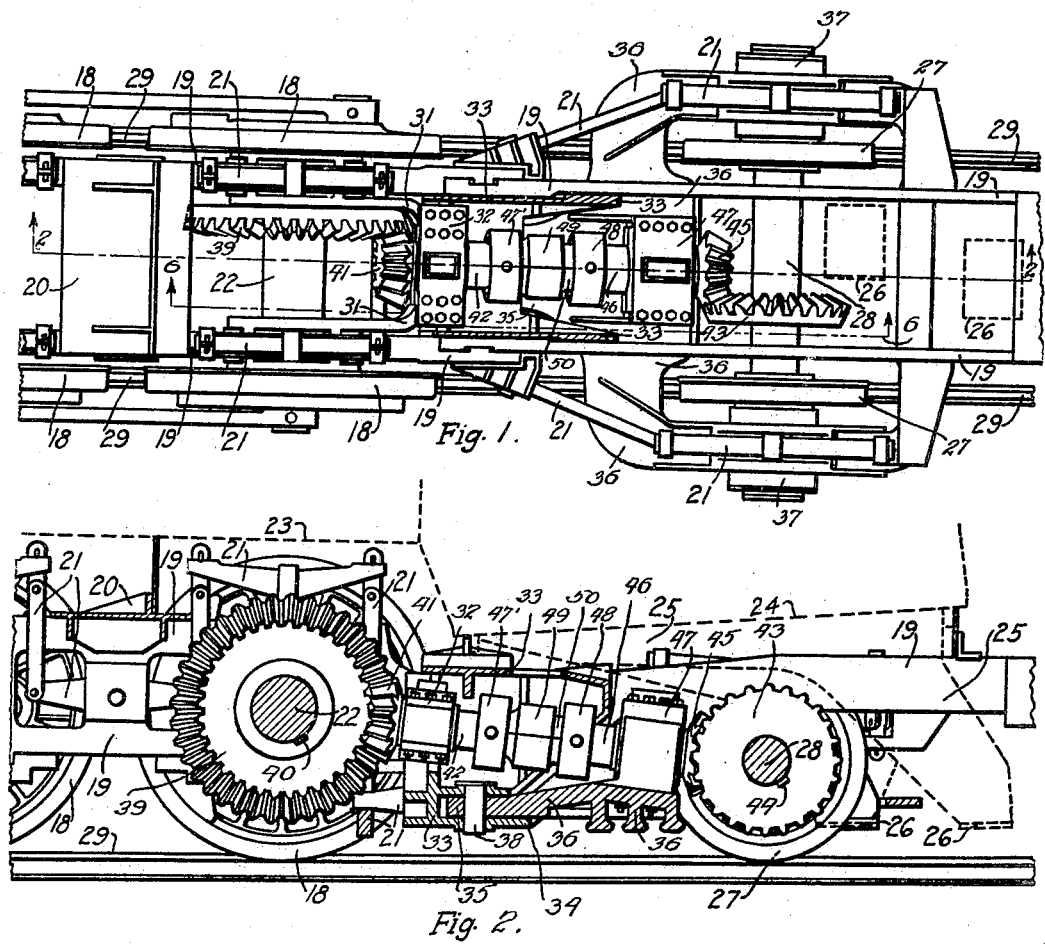
Figure 1 is a top plan view of the frame of a locomotive with the boiler and fire box removed, showing the means for driving the several parts of the traction mechanism.
Fig. 2 is a vertical sectional view taken on line 2—2 of Fig. 1.

The improved transmission and gear mechanism which forms the subject matter of this application is adapted to be associated with locomotives and like automotive vehicles of various and several types, some of which have been conventionally illustrated in the drawings, in which 18 indicates the traction wheels ordinarily referred to in a locomotive as drivers or driving wheels and which nomenclature will be continued in this application. The frame 19, cross-plates 20, springs and equalizers 21, driver axle 22, are substantially the same as found in an ordinary locomotive. At 23 an outline is shown indicating the position of the boiler; a similar outline at 24 indicates the position of the fire-box, with the outline 25 indicating the position of the ash pan, with the ash dump indicated at 26. Wheels 27 are shown which are ordinarily referred to as truck wheels, which nomenclature likewise will be continued in this specification, it being understood that in the complete embodiment these wheels also become drivers auxiliary to the drivers 18 and the use of the term "drivers" and "trucks" is only to correspond to the usual understanding of such terms and in no way intended to limit the effects or functions. The trucks 27 are connected to a shaft 28 and in the drawings rails 29 have been shown of the conventional type.

Formed preferably integral with the bearing for the driver axle 22 is a bearing 30 continued by a bracket 31 supporting a bearing block 32. A member 33 extends transversely across the structure and is rigidly carried by the side frame 19. The member 33 is bifurcated, as indicated at 34, to accommodate a tongue 35, preferably formed integral with a bolster 36 which journals the shaft 28, such journaling being indicated at 37. The member 36 forms with the shaft 28, journal 37 and truck wheels 27, a bogy which is pivoted by means of the pin 38 so that the whole frame, together with the associated parts, may swing about or be articulated upon said pin to accommodate the passage of the locomotive about curves.

The axle 22 is provided with a beveled gear 39 rigidly secured upon said axle in any approved manner as by the key 40. Intergeared with the gear 39 is a pinion 41 rigidly carried by a shaft 42 journaled in the bearing block 32. Rigidly mounted upon the shaft 28 is a gear 43, such rigid connection being secured in any approved manner, as by the key 44. Intergeared with the gear 43 is a pinion 45 rigidly carried upon a shaft 46 journaled in a box 47, the shafts 42 and 46 being provided with universal joints 47' and 48, respectively, between which is interposed a telescoping section consisting of the members 49 and 50. The universal joints are of substantially the usual and ordinary type, one being shown in cross section at Fig. 9, having a sleeve 51 embracing a spider 52 with pins 53 in the usual well known manner. The telescoping joint composed of the parts 49 and 50, also of the usual and ordinary type, is shown in cross section at Fig. 10 as composed of squared elements, one sliding within the other, but it is to be understood, of course, that the squared formation is immaterial to the present invention.

Figure 11:
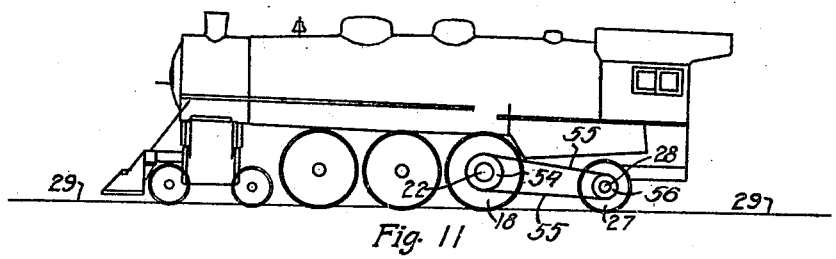
Fig. 11 is a view in side elevation of a conventional type of locomotive with modified type of driving mechanism attached thereto shown diagrammatically.

While the transmission mechanism shown at Figs. 1, 2, 5 to 10, inclusive, is found a desirable and efficient type of transmission mechanism, it is obvious that other types of transmission mechanisms may be employed for accomplishing the result with equal or acceptable efficiency, the only requirement being that the speed of rotation of the drivers to which power is directly applied shall be translated into greater speed of rotation of the trucks, the ratio of rotation being one to the other as the ratio of their circumferences. Such other transmission mechanisms is shown, therefore, at Figs. 11 to 17, inclusive. As shown at Fig. 11, a sprocket or belt wheel 54 is attached to the driver shaft 22 from which a belt or sprocket chain 55 passes engaging a sprocket or pulley 56 upon the shaft 28 of the truck wheels 27.

Figure 12:
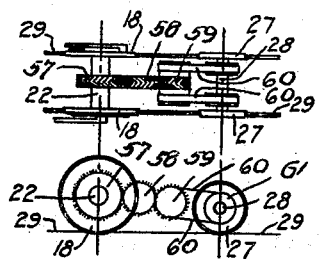
Fig. 12 is a diagrammatic view both in top plan and side elevation of a different modification.

At Fig. 12 the driver shaft 22 is provided with a herring bone gear 57 driving a train of gears 58 and 59 of the herring-bone type, the latter driving a sprocket chain or belt 60 which may be duplicated upon opposite sides of the gear 59 and engaging a sprocket or pulley 61 upon the shaft 28.

Figure 13:
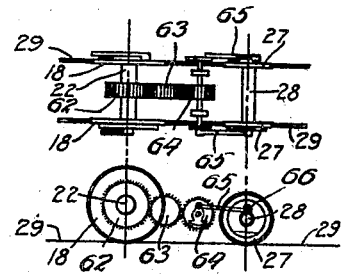
Fig. 13 is a diagrammatic view both in top plan and side elevation of a further modification.

At Fig. 13 a spur gear 62 is carried upon the shaft 22 driving a train of gears 63 and 64, the latter actuating the connecting rod 65 which may be duplicated upon opposite sides of the structure and driving the shaft 28 by means of a wrist pin 66.

Figure 14:
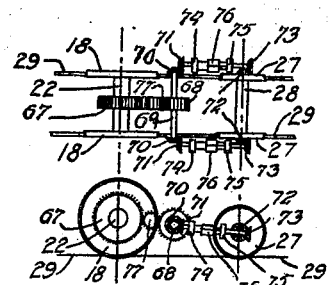
Fig. 14 is a diagrammatic view both in side elevation and top plan of a still further modification.

At Fig. 14 a spur gear 67 is carried upon a shaft 22 intergeared with a pinion 68 carried upon a shaft 69 which is provided with beveled gears 70 intergeared with beveled gears 71. The shaft 28 is provided with beveled gears 72 intergeared with beveled gears 73 which are carried upon a connecting shaft provided with universal joints 74 and 75 and a telescoping joint 76 preferably duplicated upon opposite sides of the structure. Between the gears 67 and 70 an idler 77 will preferably be introduced.

Figure 15:
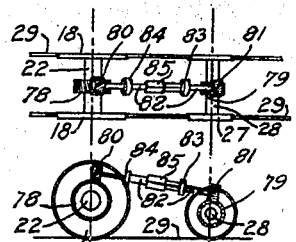
Fig. 15 is a diagrammatic view in top plan and side elevation of a still further modification.

At Fig. 15 the shaft 22 is provided with a worm gear 78, the shaft 28 being provided with a smaller worm gear 79. Worm gears 80 and 81 intergeared with said worm gears 78 and 79, respectively, are connected by a shaft 82 embodying universal joints 83 and 84 and a telescoping joint 85.

Figure 16:
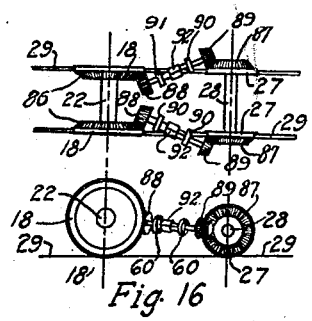
Fig. 16 is a view in side elevation and top plan of a still further modification.

At Fig. 16 the shaft 22 is provided with beveled gears 86 which may and desirably will be formed integral with the drivers 18. The shaft 28 is provided with beveled gears 87 which may and preferably will be formed integral with the trucks 27. Shafts are interposed at an acute angle between the beveled gears 86 and 87, such shafts carrying beveled pinions 88 and 89 intergeared with the gears 86 and 87. The shafts comprise in their lengths universal joints 90 and 91 and telescoping joint 92.

Figure 17:
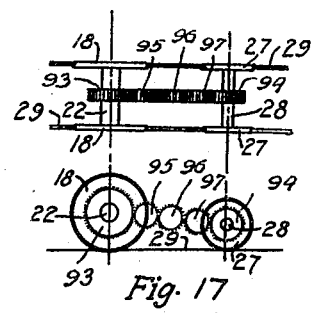
Fig. 17 is a view in side elevation and top plan of a still further modification.

At Fig. 17 the shaft 22 is provided with a spur gear 93 and the shaft 28 with a spur gear 94. Between the gears 93 and 94 a train of gears is located consisting of any approved number, as the units 95, 96 and 97.

In any of the several embodiments it is obvious that the transmission, whether it be cog-gear, belt, sprocket or other well known type, will be so proportioned that the rotation of the drivers and the trucks will be in peripheral consonance and the ratio of the gear will therefore be adjusted and determined by the peripheral ratio of the wheels.

From the foregoing description it is believed that the operation of the device in any of its embodiments will be fully and completely understood and that further description will be superfluous.

While in the drawing the truck, which is driven and converted into an auxiliary driver, is shown as the truck at the rear of the drivers and beneath the fire-box, it is obvious that the structure may be duplicated in regard to the truck wheels in front of the drivers and under the front end as usually found in locomotive construction.

I claim:

1. The combination with a locomotive embodying axle-united driving wheels, spaced bearings for the axle, a journal box carried by the bearings, a shaft journaled in the box, a pinion carried by the shaft, a gear between the spaced bearings carried by the axle and intermeshing with the pinion, a bogy attached to a pivot rigid with the journal box, truck wheels journaled in the bogy and means to transmit motion from the shaft to the truck wheels.

2. The combination with a locomotive embodying axle-united driving wheels, spaced bearings for the axle, a journal box carried by the bearings, a shaft journaled in the box, a pinion carried by the shaft, a gear between the bearings carried by the axle and intermeshing with the pinion, a bogy attached to a pivot rigid with the bearings, truck wheels journaled in the bogy upon an axle normally parallel with the driver axle and means to transmit motion from the shaft to the truck axle.

3. The combination with a locomotive embodying axle-united driving wheels, spaced bearings for the axle, a journal box carried by the bearings, a shaft journaled in the box, a pinion carried by the shaft, a gear between the bearings carried by the axle and intermeshing with the pinion, a bogy attached to a pivot rigid with the bearings, truck wheels journaled in the bogy, means to transmit motion from the shaft to the truck wheels and means interposed in the shaft to accommodate the swinging of the bogy upon its pivot.

4. The combination with a locomotive embodying axle-united driving wheels, spaced bearings for the axle, a journal box carried by the bearings, a shaft journaled in the box, a pinion carried by the shaft, a gear between the bearings carried by the axle and intermeshing with the pinion, a bogy attached to a pivot rigid with the bearing, truck wheels journaled in the bogy, and a universal joint and telescoping section interposed in the shaft and means to transmit motion from the shaft to the truck wheels.

5. The combination with a locomotive embodying axle-united driving wheels, spaced bearings for the axle, a journal box carried by the bearings, a shaft journaled in the box, a pinion carried by the shaft, a gear between the bearings carried by the axle and intermeshing with the pinion, a bogy attached to a pivot rigid with the bearings, truck wheels journaled in the bogy upon an axle normally parallel with the driver axle, means to transmit motion from the shaft to the truck wheels, and a universal joint and a telescoping section interposed in the shaft.

6. The combination with a locomotive embodying a side frame and cross-members, axle-united driving wheels journaled between the side frames, spaced bearings carried by the side frames and journaling the axle, a journal box carried by the bearings, a shaft journaled in the box, a pinion carried by the shaft, a gear between the bearings carried by the axle and intermeshing with the pinion, a bogy pivoted to the cross member upon a pivot rigid therewith, truck wheels journaled in the bogy upon an axle normally parallel with the driver axle, means to transmit motion from the shaft to the truck wheels, and a universal joint and a telescoping section interposed in the shaft.

In testimony whereof I affix my signature.

FRANK V. DE ARMOND.